Oct. 13, 1925.
G. D. FENTIMAN
FERTILIZER DISTRIBUTOR
Filed March 8, 1924    2 Sheets-Sheet 1
1,556,922
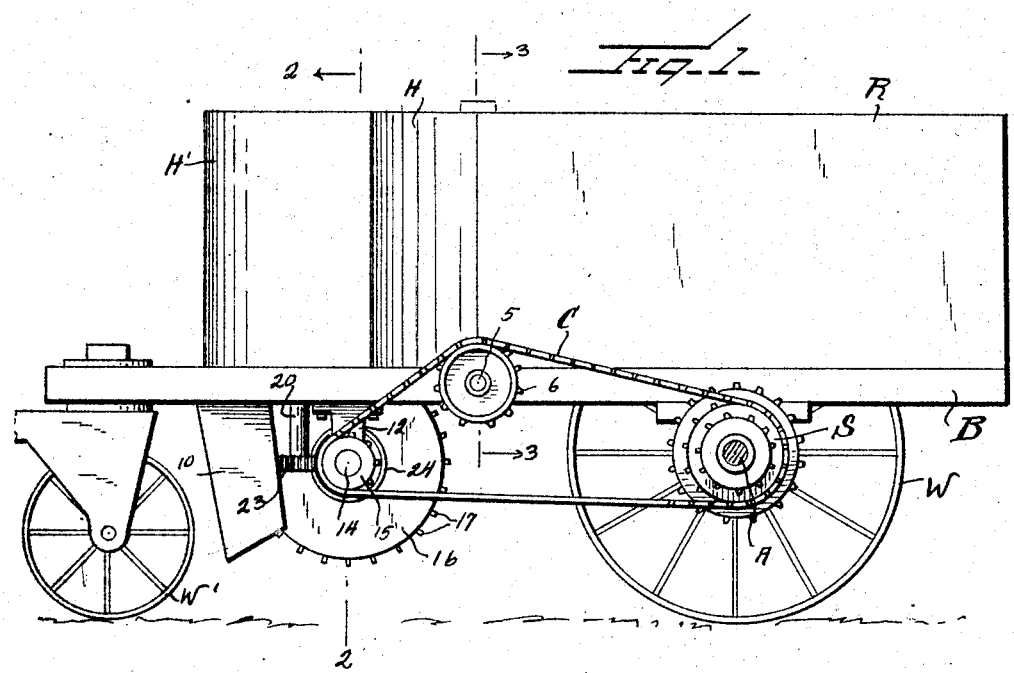
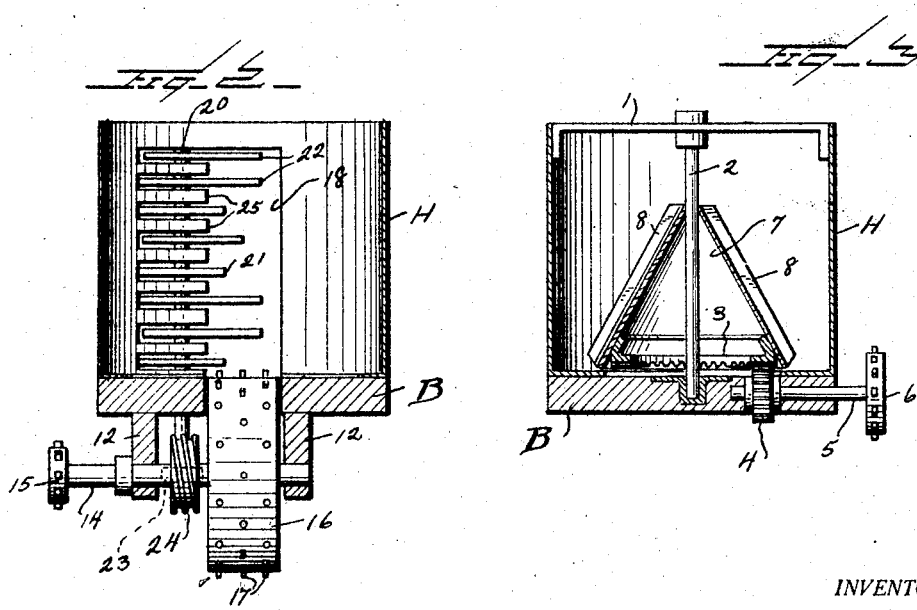
INVENTOR.
G. D. Fentiman
BY Watson E. Coleman
ATTORNEY.

Oct. 13, 1925.
G. D. FENTIMAN
1,556,922
FERTILIZER DISTRIBUTOR
Filed March 8, 1924     2 Sheets-Sheet 2
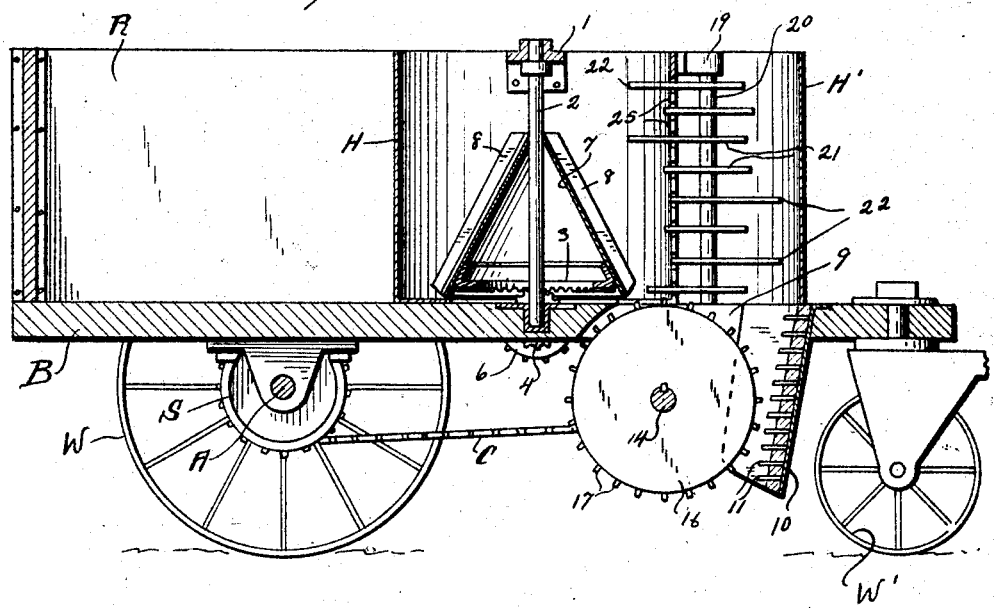
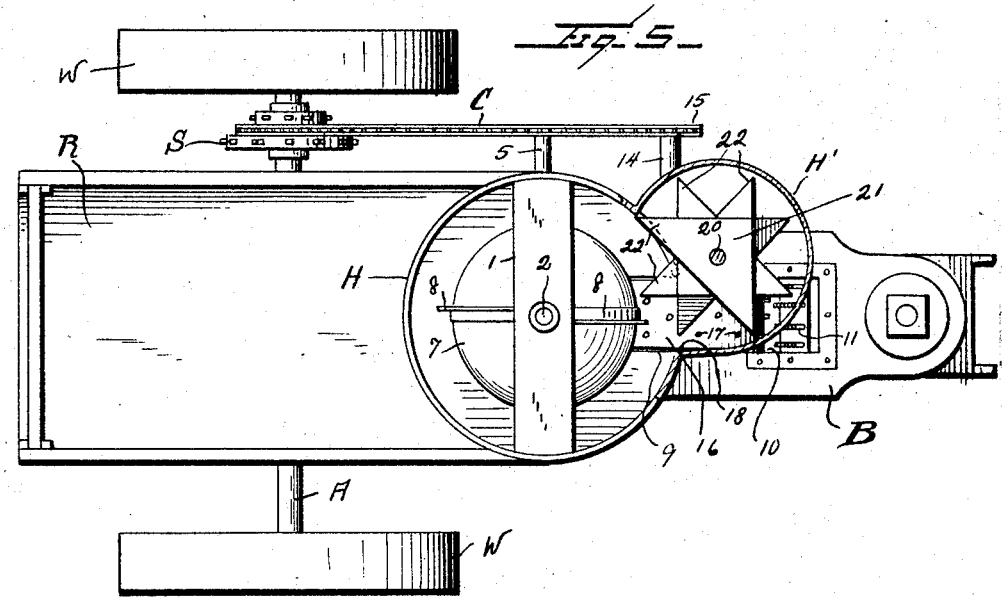
INVENTOR.
G. D. Fentiman
BY Watson E. Coleman
ATTORNEY.

Patented Oct. 13, 1925.

1,556,922

UNITED STATES PATENT OFFICE.

GEORGE DAVID FENTIMAN, OF STILLWATER, OKLAHOMA.

FERTILIZER DISTRIBUTOR.

Application filed March 8, 1924. Serial No. 697,923.

*To all whom it may concern:*

Be it known that I, GEORGE DAVID FENTIMAN, a citizen of the United States, residing at Stillwater, in the county of Payne and State of Oklahoma, have invented certain new and useful Improvements in Fertilizer Distributors, of which the following is a specification, reference being had to the accompanying drawings.

This invention relates to certain improvements in fertilizer distributors and has relation more particularly to a device of this general character especially designed and adapted for use in connection with barnyard manure and it is an object of the invention to provide novel and improved means whereby such manure is deposited upon a plant row in a comminuted or pulverized condition.

It is also an object of the invention to provide a novel and improved device of this general character embodying a hopper provided therein with means for agitating the material therein together with driven means for delivering such material from the hopper to a spout and discharging the material through the spout.

The invention consists in the details of construction and in the combination and arrangement of the several parts of my improved fertilizer distributor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein :—

Figure 1 is a view in side elevation of a distributor constructed in accordance with an embodiment of my invention;

Figure 2 is a sectional view taken substantially on the line 2—2 of Figure 1 looking in the direction of the arrow;

Figure 3 is a sectional view taken substantially on the line 3—3 of Figure 1 looking in the direction of the arrow;

Figure 4 is a longitudinal vertical sectional view taken through the device, certain of the parts being in side elevation opposite to that illustrated in Figure 1;

Figure 5 is a view in top plan of the device as herein disclosed with certain of the parts in section.

As disclosed in the accompanying drawings, B denotes a body having its rear portion mounted upon the wheel supported axle A, said axle rotating with the associated wheels W. Mounted on one end portion of the axle A inwardly of a wheel W is a differential sprocket S with which is adapted to be operatively engaged for desired speed a drive chain C.

The forward portion of the body B is supported by a caster wheel W'. Associated with the body B is a draft rigging of any desired character but as such rigging forms no part of the present invention a detailed description thereof is believed to be unnecessary.

Supported by the forward portion of the body is a hopper H herein disclosed as of a cylindrical type while the rear portion of the body is provided with a chamber or compartment R adapted to contain a reserve supply of fertilizer or manure. Disposed transversely of the body B and axially of the hopper H at the top thereof is a cross member 1 which provides a mounting for the upper end portion of a vertically disposed shaft 2. The shaft 2 is arranged at substantially the axial center of the hopper H and the lower end portion thereof is disposed through the bottom of the body B. The lower or larger end of the bottom is provided with a circular rack or gear 3 meshing with a gear 4 carried by a laterally disposed shaft 5. The shaft 5 extends to one side of the body B and is provided with a sprocket 6 with which engages the chain C hereinbefore referred to whereby the shaft 2 is caused to rotate when the body B is in transit. Arranged within the hopper H is an agitating member 7 conical in form, said member surrounding the shaft 2 and having its apex portion keyed or otherwise fixed to the shaft 2. The member 7 is provided therearound with the peripheral spaced flanges 8 whereby the material within the hopper H is placed in motion upon rotation of the shaft 2.

The body B in advance of the hopper H is provided with an opening 9 and depending from the forward end of said opening 9 is a chute 10, the inner face of which being open. The outer or closed face of the chute 10 is provided with a plurality of inwardly directed teeth 11. Depending from the body B at opposite sides of the opening 9 are the bearings 12 providing a support for the transversely disposed shaft 14, said shaft 14 being also provided with a sprocket 15 with which the chain C is operatively engaged. The shaft 14 extends across the opening 9 from below and has fixed thereto a disc 16 extending upwardly within the inner portion of the opening 9, said disc being of a width to fit substantially snug within said opening 9. The periphery of the disc 16 is provided circumferentially therearound with the outstanding teeth 17.

Partially overlying the opening 9 is a supplemental hopper H' suitably connected to the adjacent portion of the hopper H and the wall of the hopper H is provided with a relatively large opening 18 affording communication between the hopper H and the supplemental hopper H'. The upper portion of the hopper H is provided with an outstanding bearing 19 disposed inwardly of the supplemental hopper H' to provide a bearing for the upper portion of a vertically disposed shaft 20, the lower portion of said shaft extending through the body B at one side of the opening 9 and rotatably supported by said body. At points spaced longitudinally thereof the shaft 20 is provided with the members 21 each of which is herein disclosed as being triangular in form to provide a plurality of tearing teeth or elements 22. The lower portion of the shaft 20 is provided with a worm wheel 23 engaging a worm 24 fixed to the shaft 14 hereinbefore referred to whereby requisite rotation is imparted to the shaft 20. The outer vertical edge of the opening 18 is provided with the inwardly directed arms 25 which extend between adjacent members 21 and provide means whereby the desired delivery of the material is assured to the opening 9.

In practice, a supply of barnyard manure is placed within the hopper H and when the body B is in transit the agitating member 7 will place such material in motion and the tearing teeth or elements 22 comprised in the plates or members 21 will pass within the hopper H and draw such material within the supplemental hopper H' and at the same time initially comminuting such material. The disc 16 rotates in a direction whereby the teeth 17 carried thereby will carry the material downwardly of the chute 10, said chute 10 together with the teeth 17 serving to further pulverize or comminute the material so that it will be dropped upon the plant row in such condition.

The distributor as herein disclosed is of a type for use in connection with a single row.

From the foregoing description it is thought to be obvious that a fertilizer distributor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A fertilizer distributor comprising, in combination, a portable body, a hopper mounted thereon, a supplemental hopper, an opening in the wall of the first named hopper affording communication with the supplemental hopper, vertically spaced tearing members mounted in the supplemental hopper and extending through the opening into the first named hopper, means for rotating said members, a discharge chute in communication with the supplemental hopper, and transversely disposed arms supported by the first named hopper and extending partially across the opening between the two hoppers, each of said arms being disposed between adjacent tearing members.

In testimony whereof I hereunto affix my signature.

GEORGE DAVID FENTIMAN.